United States Patent Office 2,851,358
Patented Sept. 9, 1958

2,851,358

RECONSTITUTED DRY MILK PRODUCT

John L. McCarthy, Worcester, Mass.

No Drawing. Application April 24, 1956
Serial No. 580,166

3 Claims. (Cl. 99—56)

This invention relates to a therapeutic dry milk or potable dry milk product.

As is well known, powdered milk, as now marketed, is flat or tasteless and is not palatable. This is particularly true of powdered, non-fat milk. Powdered whole milk is high in fat content and deteriorates after a lapse of time. Moreover, the dehydrating process used in making powdered whole milk imparts a slightly scorched flavor to the butter-fat content.

This invention has for its salient object to provide a reconstituted potable, powdered milk product that will be palatable, low in fat, and high in protein content.

Another object of this invention is to employ a protective and edible blending agent, low-bloom gelatin, in this instance, that will minimize the objectionable, strong taste factor necessarily present in powdered whole milk as a result of extremely high temperatures employed in the process of dehydration, and thus render the objective product more palatable.

Another object of the invention is to provide a reconstituted potable, powdered milk product so constituted that it has an improved texture, will not deteriorate after a lapse of time, will build up energy and lessen fatigue, and will be highly palatable.

Further objects of the invention will appear from the following detailed specification.

In carrying out the invention, powdered non-fat milk and powdered whole milk and light-bloom gelatin are mechanically mixed or stirred and the mixture is fortified with ascorbic acid in powdered form and ferric phosphate, also in powdered form. The addition of these two products, namely, the ascorbic acid and iron, render the reconstituted milk product a more perfect food, especially for the feeding of infants.

As an example of the proportions of the products named, the following has been found satisfactory:

16 oz. of standardized non-fat powdered milk
10 oz. of standardized powdered whole milk
1 oz. of light-bloom edible gelatine and sufficient ferric phosphate and ascorbic acid to satisfy the daily requirements for infant feeding.

The gelatin should be a very light-bloom, 100 bloom or less, and the bloom should be sufficiently low so that when mixed with the reconstituted mixture of non-fat and whole milk powder and water has been added and the liquid thereby formed is cooled, it will remain pleasingly potable and the gelatin will not congeal or gel.

The gelatin forms an envelope around the fat globules of the whole milk and eliminates any objectionable taste from the whole milk.

The product above described provides a pleasing, palatable, nutritional, therapeutic food beverage fortified with vitamin C and iron, high in protein and low in fat. The use of this product will increase the energy and lessen the fatigue of the user and will prove highly beneficial.

The therapeutic agent in this formula, edible light-bloom gelatin, imparts the following nutritional properties to this product:

(1) Adds to the food value of the milk.
(2) Increases the palatability.
(3) Facilitates digestion.
(4) Elevates the protein content.
(5) Improves the texture of the product.
(6) Increases physical endurance.
(7) Helpful in malnutrition fortification.
(8) Lessens fatigue.
(9) Employed in infant feedings.
(10) Furnishes immediate protein energy.

In addition to the above stated benefits, many additional therapeutic advantages have been ascribed to the use of gelatin in the diet as employed to advantage and generally in hospital diet therapy. Therapeutic benefits cited in application ascribed to gelatin or glycin, its major constituent, were confirmed and disclosed by Dr. G. R. Ray, Long Island College of Medicine, and Doctors Krummacher and Downey at Mellon Institute, University of Pittsburgh.

Although one specific embodiment of the invention has been particularly described, it will be evident that changes may be made without departing from the spirit or scope of the invention, as expressed in the following claims.

What I claim is:

1. A method of treating a dry milk powder wherein when mixed with water it will form a reconstituted milk for drinking which has improved flavor and texture and is free of a chalky and scorched taste, comprising the steps of adding to said powder an edible light bloom gelatin sized in the range of 100 bloom and finer, and intimately mixing said ingredients.

2. An improved dry milk powder which when mixed with water will form a reconstituted milk for drinking which has improved flavor and texture and is free of a chalky and scorched taste, consisting of dessicated milk and an edible light bloom gelatin sized in the range of 100 bloom and finer in an intimate mixture therewith.

3. An improved dry milk powder which when mixed with water will form a reconstituted milk for drinking which has improved flavor and texture and is free of a chalky and scorched taste, consisting of dry non-fat milk powder, dry whole milk powder and gelatin sized in the range of 100 bloom and finer, mixed in the following proportions:

|  | Oz. |
|---|---|
| Non-fat milk powder | 16 |
| Whole milk powder | 10 |
| Edible gelatin (100 bloom to finer) | 1 |

References Cited in the file of this patent

UNITED STATES PATENTS

| 1,159,455 | Wieda | Nov. 9, 1915 |
| 1,808,730 | Bornegg | June 2, 1931 |
| 2,411,636 | Preiswerk | Nov. 26, 1946 |
| 2,481,414 | Grindrod | Sept. 6, 1949 |
| 2,659,676 | Howard | Nov. 17, 1953 |

OTHER REFERENCES

U. S. Dispensatory, 24th ed., Philadelphia, 1947, pages 472–3.